US009952987B2

United States Patent
Guddeti et al.

(10) Patent No.: US 9,952,987 B2
(45) Date of Patent: Apr. 24, 2018

(54) POSTED INTERRUPT ARCHITECTURE

(71) Applicant: Intel Corporation, Santa Clara, CA (US)

(72) Inventors: Jayakrishna Guddeti, Bangalore (IN); Luke Chang, Aloha, OR (US); Rajesh M. Sankaran, Portland, OR (US); Junaid F. Thaliyil, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 448 days.

(21) Appl. No.: 14/553,430

(22) Filed: Nov. 25, 2014

(65) Prior Publication Data

US 2016/0147679 A1    May 26, 2016

(51) Int. Cl.
*G06F 13/24*     (2006.01)
*G06F 12/0871*   (2016.01)

(52) U.S. Cl.
CPC .......... *G06F 13/24* (2013.01); *G06F 12/0871* (2013.01); *G06F 2212/1032* (2013.01); *G06F 2212/657* (2013.01)

(58) Field of Classification Search
None
See application file for complete search history.

(56) References Cited

U.S. PATENT DOCUMENTS

| 8,566,492 B2 * | 10/2013 | Madukkarumukumana ............. G06F 13/24 710/260 |
| 2010/0023666 A1 | 1/2010 | Mansell et al. |
| 2013/0151782 A1 | 6/2013 | Liu et al. |
| 2014/0223060 A1 | 8/2014 | Tsirkin et al. |
| 2015/0006825 A9 * | 1/2015 | Nayyar ............... G06F 12/0831 711/141 |

FOREIGN PATENT DOCUMENTS

WO    WO2016-085645    6/2016

OTHER PUBLICATIONS

"Intel Virtualization Technology for Directed I/O Architecture Specification", Oct. 2014, Rev. 2.3.*
"Intel Virtualization Technology for Directed I/O," Architecture Specification, Oct. 2014.
International Preliminary Search Report on Patentability and Written Opinion in International Application PCT/US2013/077149 dated Mar. 29, 2016.
International Preliminary Report Written Opinion and Search Report in International Application No. PCT/US2015/059821 dated May 30, 2017, 14 pages.

* cited by examiner

*Primary Examiner* — Ilwoo Park
(74) *Attorney, Agent, or Firm* — Alliance IP, LLC

(57) ABSTRACT

An interrupt is identified from an input/output (I/O) device and an address of a particular cache line is identified associated with the interrupt. The cache line corresponds to a destination of the interrupt and represents one or more attributes of the interrupt. A request is sent to a coherency agent to acquire ownership of the particular cache line and a request is sent to perform a read-modify-write (RMW) operation on the cache line based on the interrupt.

20 Claims, 12 Drawing Sheets

POSTED INTERRUPT ARCHITECTURE

FIELD

This disclosure pertains to computing system, and in particular (but not exclusively) to error handling.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand increases for future processors to consume at even higher-rates corresponding demand is placed on the capabilities of existing interconnect architectures.

Virtualization can be supported in some systems. Generally, the concept of virtualization in information processing systems allows multiple instances of one or more operating systems (each, an "OS") to run on a single information processing system, even though each OS is designed to have complete, direct control over the system and its resources. Virtualization is typically implemented by using software (e.g., a virtual machine monitor, or a "VMM") to present to each OS a "virtual machine" ("VM") having virtual resources, including one or more virtual processors, that the OS may completely and directly control, while the VMM maintains a system environment for implementing virtualization policies such as sharing and/or allocating the physical resources among the VMs (the "virtualization environment"). Each OS, and any other software, that runs on a VM is referred to as a "guest" or as "guest software," while a "host" or "host software" is software, such as a VMM, that runs outside of the virtualization environment.

A physical processor in an information processing system may support virtualization, for example, by supporting an instruction to enter a virtualization environment to run a guest on a virtual processor (i.e., a physical processor under constraints imposed by a VMM) in a VM. In the virtualization environment, certain events, operations, and situations, such as external interrupts or attempts to access privileged registers or resources, may be intercepted, i.e., cause the processor to exit the virtualization environment so that a VMM may operate, for example, to implement virtualization policies (a "VM exit").

BRIEF DESCRIPTION OF THE DRAWINGS

Like reference numbers and designations in the various drawings indicate like elements.

DETAILED DESCRIPTION

Figure 1:
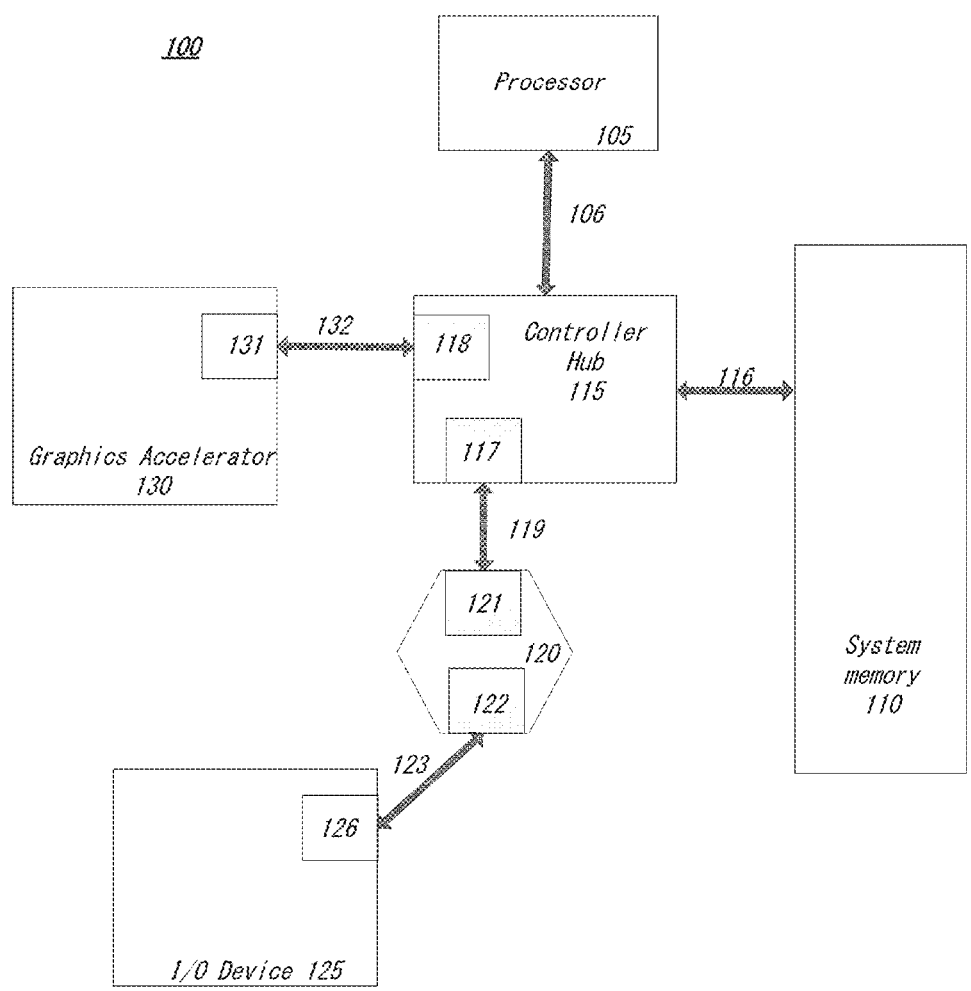
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115, such as a root hub or root complex, through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
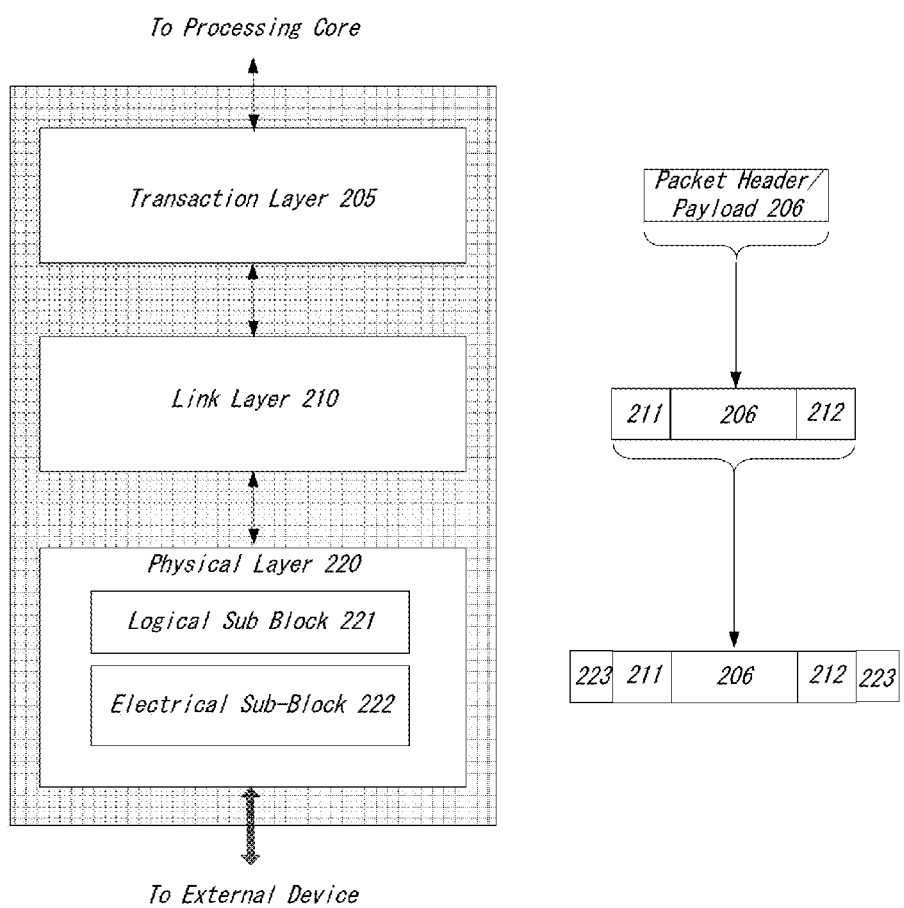
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. An example header packet format is illustrated, for instance, in FIG. 8. Other example packet headers/payloads can be formatted based on various protocol specifications, such as the header/payload formats found in the PCIe specification at the PCIe specification website.

Figure 3:
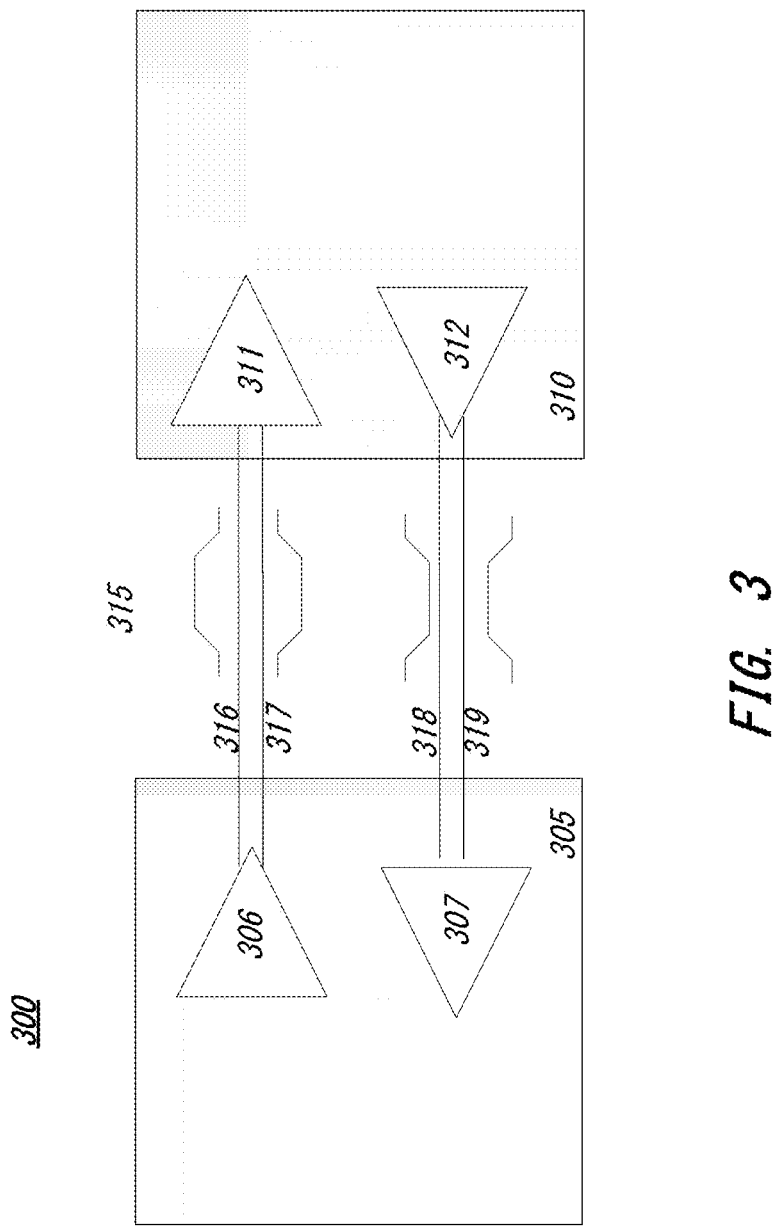
FIG. 3 illustrates an embodiment of a packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
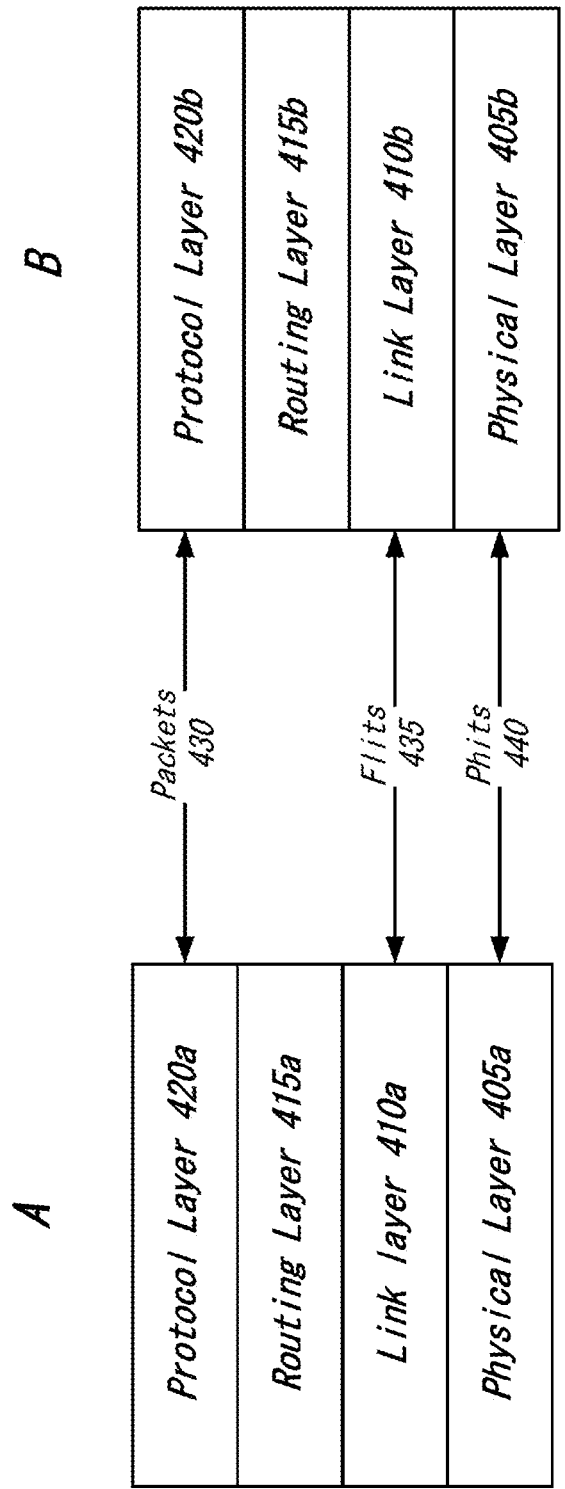
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by ×N, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Computing systems can be virtualized to allow multiple environments to be run on a single system. Virtualization performance has developed such that a server system implementing virtualization can result in large amount of idle capacity that can be used to maximize the computing resources of the server system. Virtualization, however, can introduce its own additional overhead, such as through the provision of a virtualization layer. Solutions have been sought to address this overhead. For instance, processor, chipset, I/O and interconnect enhancements have been developed toward this end to improve performance, efficiency, and robustness of virtualized platforms.

I/O virtualization solutions provide the same isolation that would be found if each environment running on a separate physical machine. Solutions also aim to provide near native performance for I/O operations. Isolation should provide separation of memory space. Isolation can separate I/O streams, interrupts, and (in the case of shared devices) the ability to isolate control operations, I/O operations and errors. In software sharing approaches, isolation can be enforced by a virtualization layer. For shared hardware devices where the virtualization layer is bypassed for I/O, other can be used to enforce isolation.

Figure 5:
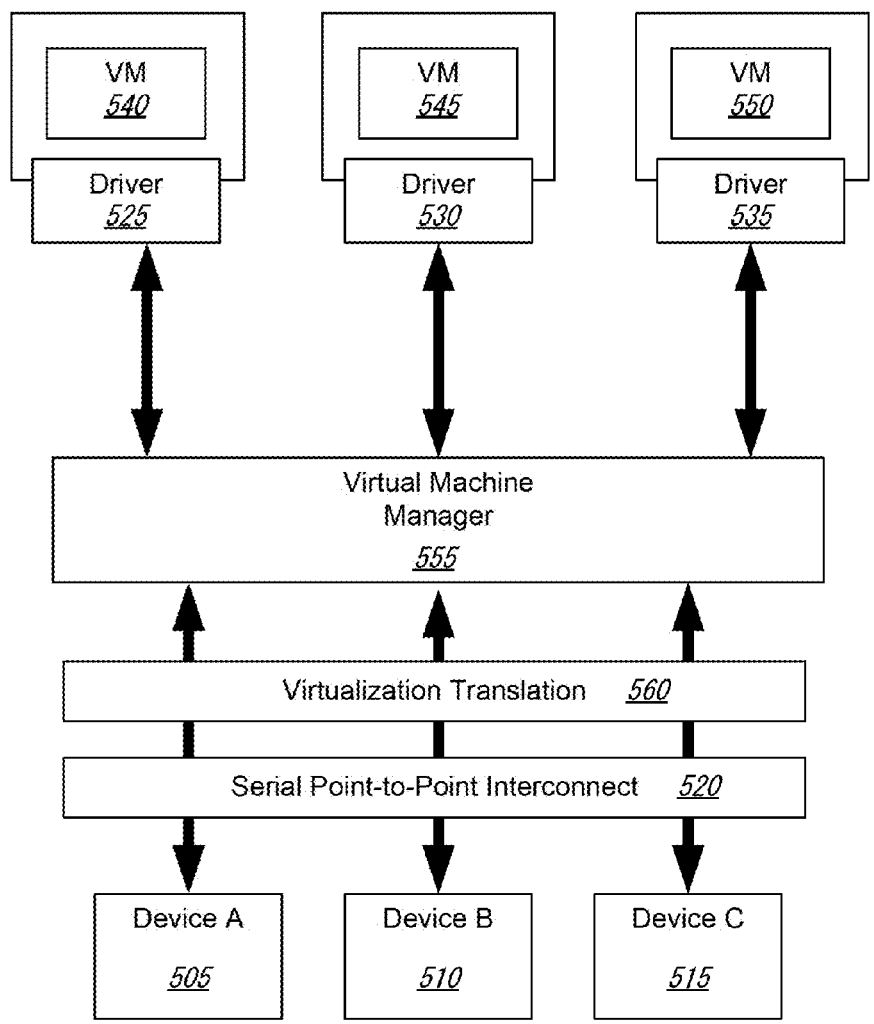
FIG. 5 illustrates an embodiment of a virtualization system.

In one example, illustrated in the simplified block diagram of FIG. 5, a system 500 can include one or more I/O devices 505, 510, 515 can connect through an interconnect 520 to guest drivers 525, 530, 535 hosted on virtual machines 540, 545, 550. A virtual machine manager (VMM) 555 can be provided to implement a virtual software-based switch to route packets to and from the appropriate virtual machines. An address translation layer 560 can be used to provide an interface between the interconnect 520 and the emulation layer of the VMM 555. In some cases, significant CPU overhead may be used by a virtual machine manager (VMM) to implement the virtual software-based switch, with this CPU overhead reducing the maximum throughput on an I/O device. In some instances, processing each packet through the software switch can utilize multiple CPU cycles. Accordingly, the I/O emulation layer of the VMM, in some implementations, can add overhead to I/O operations.

Virtualization address translation 560, such as Intel® VT-d technology, can facilitate memory translation and ensure protection of memory that enables a device to perform direct memory access (DMA) to/from host memory. Virtualization translation 560 can allow the I/O emulation layer of the VMM 555 to be bypassed, resulting in throughput improvement for virtual machines. In one implementation, address translation can allow a virtual machine to have direct access to a physical address (if so configured by the VMM). This can allow a device driver (e.g., 525, 530, 535) within a virtual machine (e.g., 540, 545, 550) to be able to write directly to registers of an IO device (e.g., 505, 510, 515). Similarly, virtualization translation 560 can write directly to memory space of a virtual machine, such as a DMA operation.

In some implementations, the VMM 555 utilizes and configures virtualization translation layer 560 to perform address translation when sending data to and from an I/O device (e.g., 505, 510, 515). The virtualization translation layer 560 can provide a hardware based mechanism to translate addresses for DMA transactions issued by I/O devices. In some cases, the address space seen by the guest operating system (OS) is not the same as the underlying physical address of the host machine. When a guest OS talks directly to an I/O device, it provides the Guest Physical Address (GPA) in the commands and buffer descriptors. The GPA is used by the I/O device when it issues the DMA transaction and is to be translated to a Host Physical Address (HPA) so that DMA transactions can target the underlying physical memory page that has been configured as the DMA buffer. Virtualization translation can utilize values in packets as an index to a lookup table that is created by the VMM.

The field(s) can correspond to one of the directly assigned functions and identify the associated virtual machine. By identifying the virtual machine context and using the lookup tables, the chipset can translate the DMA address so that it targets the correct physical page and it can apply protection mechanisms to ensure that DMA operations cannot affect memory space of unrelated virtual machines, among other examples.

Figure 6:
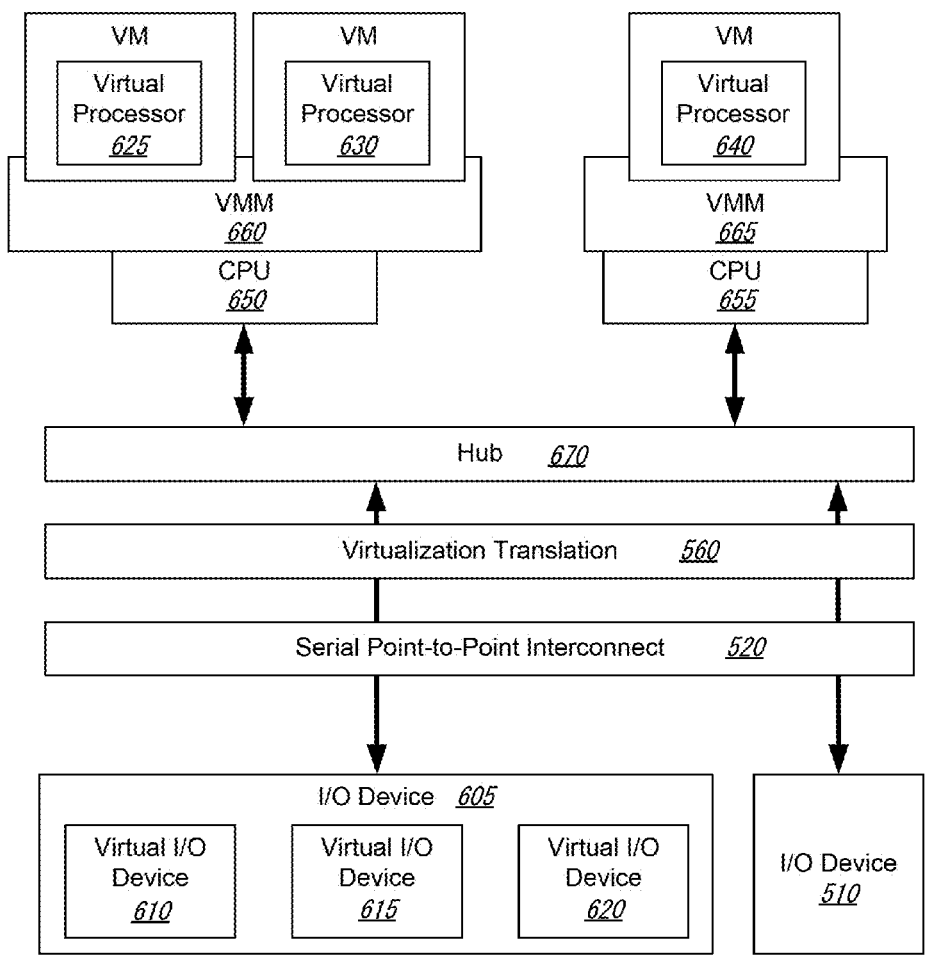
FIG. 6 illustrates another embodiment of a virtualization system.

FIG. 6 shows a block diagram illustrating another system supporting virtualization, including hardware-based virtualization. For instance, an I/O device 605, such as a network interface controller (NIC), can be provided in the system and can be shared between multiple virtualized resources instantiated in virtual machines (VMs), such as virtual processors (e.g., virtual CPUs) 625, 630, 640. In some implementations, a VMM or other software can manage multiple virtual resources' use of a single I/O device, such that the I/O device appears to belong solely to each of the virtual resources (e.g., 625, 630, 640). In hardware-based virtualization, an I/O device 605 can be provided that is configured to present itself as multiple virtual instances (e.g., 610, 615, 620) of the I/O device. Indeed, in some cases, each instance of the virtual I/O device can be mapped to a corresponding virtual resource (e.g., virtual processors 625, 630, 640) such that each virtual resource effectively has its "own" I/O device, simplifying the routing of information to and from the I/O device 605 from and to the multiple virtual resources. This can increase the efficiency of the virtualization system by allowing higher-latency, software-based VMM (e.g., 660, 665) resources to be instead dedicated to other functions.

Additionally, as illustrated in the example system of FIG. 6, in some cases, virtual machines can be flexibly instanced and hosted by multiple processors (e.g., 650, 655). For instance, in one session, a virtual machine hosting a first virtual processor 625 can be executed using a first physical processor (e.g., CPU 650). In another subsequent session, however, the same virtual processor 625 can be hosted in a virtual machine hosted by a different physical processor (e.g., CPU 655), and so on. Such variability in multiprocessor systems can introduce still additional overhead in routing communications between I/O devices (including virtual and physical I/O devices (e.g., 510)) and various virtual machines, including interrupt.

As described for instance, in U.S. Pat. No. 8,566,492, incorporated herein in its entirety, a posted interrupt can be supported (e.g., using logic of hub 670 (such as a root hub or root complex)). External interrupts can be generated by I/O devices (e.g., 510, 610, 615, 620) and intercepted by VMMs to be routed to the appropriate virtual processor. Alternatively, a virtualization environment may provide for external interrupts to be routed to a virtual processor without a VM exit, for example, if the interrupt request is generated by an input/output ("I/O") device assigned to the currently active VM, or if the interrupt request is an inter-processor interrupt between two virtual processors in the same VM. Whether the interrupt request causes a VM exit or not, routing the interrupt to the appropriate virtual processor may include mapping interrupts requests from a guest's view of the system to a host's view of the system. In existing information processing systems, the VMM may be responsible for remapping interrupt requests whenever a virtual processor is migrated from one physical processor to another physical processor.

Posted interrupts can provide benefits including optimizing system performance and efficiency by atomically directing interrupt requests to migrating virtual processors, potentially increase system performance by reducing the number of VM exits (such that delivery of an interrupt corresponds to active states of the virtual resource), and expanding the number of interrupt sources possible in a virtualization environment as compared to conventional systems. For instance, in traditional systems employing hardware-based virtualization, such as Single Root I/O Virtualization (SRIOV), when an I/O device (e.g., a PCIe device) sends an interrupt (either in the format of a message (e.g., as a Message Signaled Interrupt (MSI)) or as a legacy wire interrupt signal), the system may be forced to exit from the Guest environment of the virtual machine (VM) to the Host environment (e.g., of the virtual machine manager (VMM)) in order to process the interrupt. This can effectively reverse many of the efficiencies of using a hardware-based virtualization solution, as every time the system transitions back-and-forth from Guest to Host, thousands of cycles are spent saving and restoring the state of the VM of the exited Guest environment. This drastically reduces system level performance for I/O device interrupts in such systems. In addition, the number of interrupt vectors per physical processor is traditionally limited (e.g., to 256 on an x86 system) as these vectors are typically statically allocated per guest machine on each host device. This can result in a substantial limitation on the potential number of virtual machines that can be assigned to a single physical processor, thereby limiting the overall scalability of virtualization.

Figure 7:
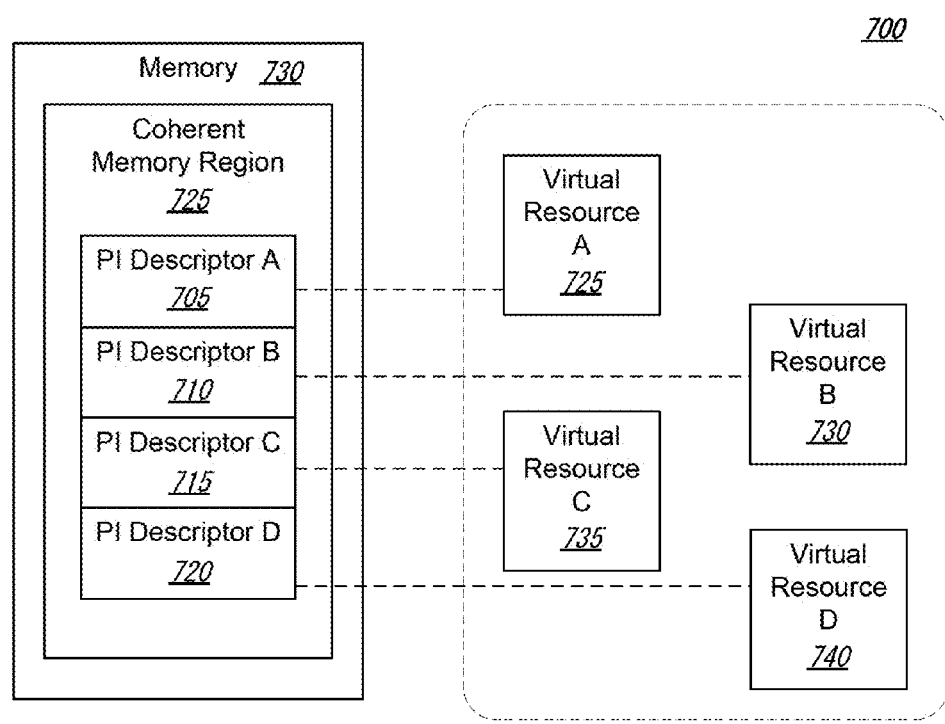
FIG. 7 illustrates a representation of posted interrupt descriptor cache.

In one example of a posted interrupt, an interrupt request can be received (e.g., as a signal or message) through an interface. The interrupt request can supply a "handle," such as an entry number, address, index, pointer, or other locator, that can be used by address translation or look-up logic to identify, in an interrupt remapping table (e.g., IRT), an entry (e.g., IRTE) corresponding to the handle. The entry can indicate whether a posted interrupt feature is to be used in handling the interrupt. In such cases, the entry can indicate an address of a line of coherency cache memory (a posted interrupt descriptor) that is used to store information describing the interrupt. As shown in the simplified block diagram 700 of FIG. 7, posted-interrupt descriptor cache line (e.g., 705, 710, 715, 720) can be stored in a coherent memory region 725 of system memory 730, or in any other storage area in the system. A posted interrupt descriptor can be allocated (e.g., by software, such as using a VMM) for each virtual processor (e.g., 725, 730, 735, 740) that may be the target of an interrupt. The posted interrupt descriptor can include various fields for recording information concerning the interrupt. When appropriate, the information from this cache line can be accessed to provide the interrupt to targeted virtual processor.

A posted interrupt descriptor can be read-from and/or written-to, for instance, using a read-modify-write operation. In some implementations, an atomic read-modify-write operation can be used to allow access to a posted interrupt descriptor by potentially multiple sources, such as multiple instances of logic for updating values of the posted interrupt descriptor, other interrupt posting hardware, and software such as a VMM. Upon determining an opportunity to provide the interrupt to its intended virtual processor, an interrupt notify event can be generated and routed to the physical processor hosting the virtual processor, with the notify event providing information from the corresponding posted interrupt descriptor to allow the virtual interrupt to be provided to the virtual processor. Such systems, while providing substantial efficiencies, can still place a heavy load on VMMs and other system resources.

A system can be provided with logic, implemented in hardware, software, and/or firmware, to provide features and solutions to address one or more of the above issues. For instance, a finite state machine (FSM) (e.g., implemented as one or more modules of FSM logic) can be provided to handle posted interrupts all without a side agent or VMM's involvement. For instance, FSM logic can be provided to handle posted interrupts in line for each root port (e.g., PCIe root port), without depending on a side agent. This can drastically improve interrupt performance and also avoids interconnect bandwidth loss because of interrupt delivery latency. Further, in some implementations, all sub-operations performed in connection with the posted interrupt delivery can be processed to strictly follow interconnect ordering rules (e.g., PCIe ordering rules) for posted type transactions. For instance, ordering rules can ensure that data is written to DRAM before the corresponding interrupt reaches the core, so that when the device driver gets interrupt there is data in DRAM, among other examples.

Figure 8:
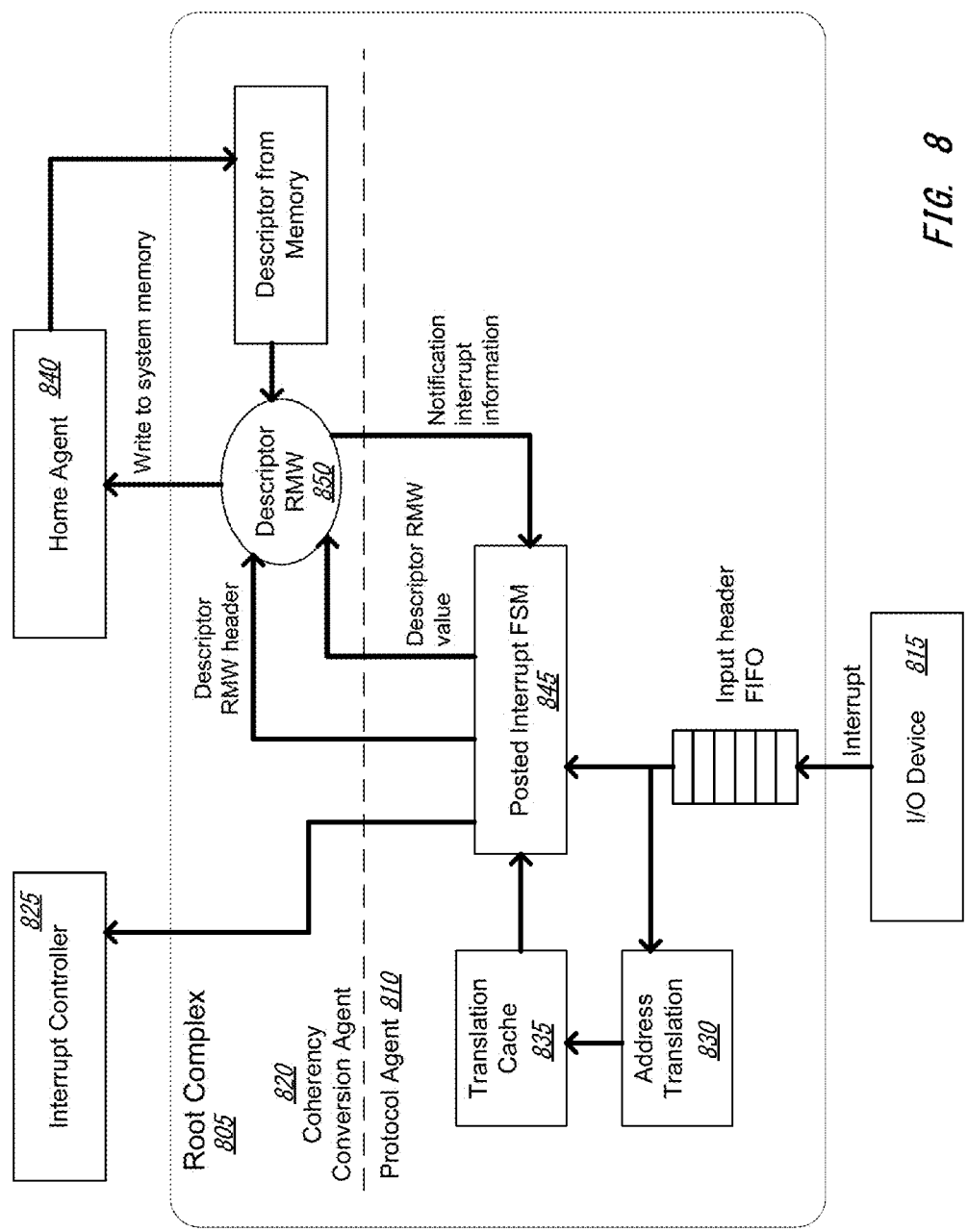
FIG. 8 is a simplified block diagram of a system including a root complex.

Turning to FIG. 8, a simplified block diagram 800 is shown of one example of a system. The system can include a root port, hub, or root complex (referred to collectively herein as root complex) 805 that includes a protocol agent 810 configured to support one or more particular protocols (e.g., PCIe, QPI, HPI, USB, etc.) of an interconnect, such as an interconnect fabric of one or more links connecting components of the system, including I/O device 815. The root complex 805 can further include a coherency conversion agent (or coherency agent) 820 configured to support a coherency protocol and convert protocol messages and signals into messages and/or signals of the coherency protocol. The agents 810, 820 of the root complexes can be fully contained within the logic of the root complex 805 and can support translation of a interrupt handle, pre-fetching of a posted interrupt descriptor, fetching of the posted interrupt descriptor data, and interrupt notification generation, in accordance with the principles of posted interrupts, as described herein. Such interrupt notifications can be sent to an interrupt controller 825 corresponding to the target of the interrupt.

In one example, illustrated in FIG. 8, an interrupt, such as an MSI, can be received from a PCIe device (or other I/O device) at a root complex (e.g., associated with one or more processors, including virtualized processors (instantiated in a VM using a physical processing unit (CPU)). Root complex logic can be provided to send the interrupt to an address translation engine 830 to map a handle value included in the interrupt to an address of a particular virtualized resource included in an entry of an interrupt remapping table managed by the address translation engine 830. Alternatively, the root complex logic can identify a target address, or handle, of the interrupt and send only data describing the handle to the address translation engine for translation. In some examples, an address translation engine 830 can be implemented as a SRIOV translation engine of a PCIe root complex. As part of translation, the address translation engine 830 can fetch an entry in a re-mapping table based on the handle of the received interrupt. The table can map handles to posted interrupt descriptor addresses. Accordingly, the address translation engine can return a corresponding posted interrupt descriptor address in response to the handle. A posted interrupt descriptor address can reference a specific address in a portion of physical memory of the system. The portion of memory can be implemented in a cache coherent memory region. In some implementations, each posted interrupt descriptor can correspond to a line of cache in the portion of coherent memory. Accordingly, the address can reference the particular cache line of the corresponding posted interrupt descriptor. In addition to returning the posted interrupt descriptor address, other information can be returned (or accessed) regarding the posted interrupt descriptor, such as a virtual interrupt vector number and urgency information to be used in sending a physical interrupt (or interrupt notification) to interrupt logic of a processor. In some implementations, after translating the handle to a posted interrupt descriptor address, address translation engine 830 (or another component) can cause the descriptor address, interrupt vector number, urgency information, etc. to be stored in cache memory, or "translation cache" 835 for later use in processing the posted interrupt. A translation cache can store values from remapping table entries for a particular remapped interrupt, so that the a remapping table entry values (which includes posted interrupt descriptor address and virtual vector) are used during prefetch and fetch phases of the transaction (e.g., as opposed to posted interrupt descriptors, which hold up to 256 interrupts and status). For instance, during later phases of a posted interrupt transaction (e.g., a pre-fetch and fetch stage), root complex logic (e.g., the protocol agent 810) can access the translation cache 835 to look up the posted interrupt descriptor address and other information for use in handling a received interrupt request to be processed as a posted interrupt.

In some implementations, a protocol agent 810 can be provided for handling interrupts of a particular interconnect protocol (e.g., a PCIe agent) that can also enforce ordering rules of the protocol. The protocol agent 810, in some cases, may not possess functionality to compatibly support related coherency protocols. Accordingly, additional logic, such as a coherency conversion agent 820 can be provided to interface with other coherency agents and home agents (e.g., 840) and translate messages, requests, and transactions of the protocol (e.g., as received by the protocol agent 810) into coherent-compatible messages. Further, in the example of FIG. 8, such an architecture can be used to achieve lesser latency in updating a posted interrupt descriptor cache line. For instance, a protocol agent 810 can send a pre-fetch request to the coherency agent 820 for the posted interrupt descriptor corresponding to a posted interrupt descriptor address received from address translation engine 830. The coherency agent 820 can then negotiate a request for ownership of the particular posted interrupt descriptor cache line (e.g., from home agent 840). For instance, the coherency agent 820 can perform snoops and other appropriate coherency tasks before gathering ownership of the corresponding posted interrupt descriptor.

Once ownership of the posted interrupt descriptor cache line is obtained by the coherency agent 820, the coherency agent 820 can indicate that the cache line has been successfully pre-fetched. Up to this point, the protocol 810 agent may not have been constrained by protocol ordering rules. However, in some examples, in order to perform a read-modify-write (RMW) operation on the posted interrupt descriptor cache line, the protocol agent 810 may first ensure that the original interrupt (e.g., the original MSI) (which is a posted type transaction) meets ordering rules of the protocol. For instance, the root complex can maintain an ordering queue (e.g., FIFO) for each device/port, each ordering queue representing the order the transactions came in from the device or link. While processing the transactions, the root complex can read the transactions from the ordering FIFO queue and apply the ordering rules defined for the interconnect (e.g., as defined in the corresponding interconnect protocol specification (e.g., PCIe 3.0)) and allow or block a particular type of transaction (e.g., posted, non-posted, complete) based on whether that transaction passed the ordering criteria. Once proper compliance with ordering rules has been established, the protocol agent can proceed with a fetch stage by sending a RMW request to the coherency agent 820, to cause the coherency agent 820 to perform the atomic RMW request on the posted interrupt descriptor to potentially modify one or more values of the corresponding posted interrupt descriptor as well as access values of the descriptor. For instance, as part of the read-modify-write, the coherency conversion agent can set a particular bit in the posted interrupt descriptor indicating the interrupt vector and valid interrupt, among other examples.

Figure 9:
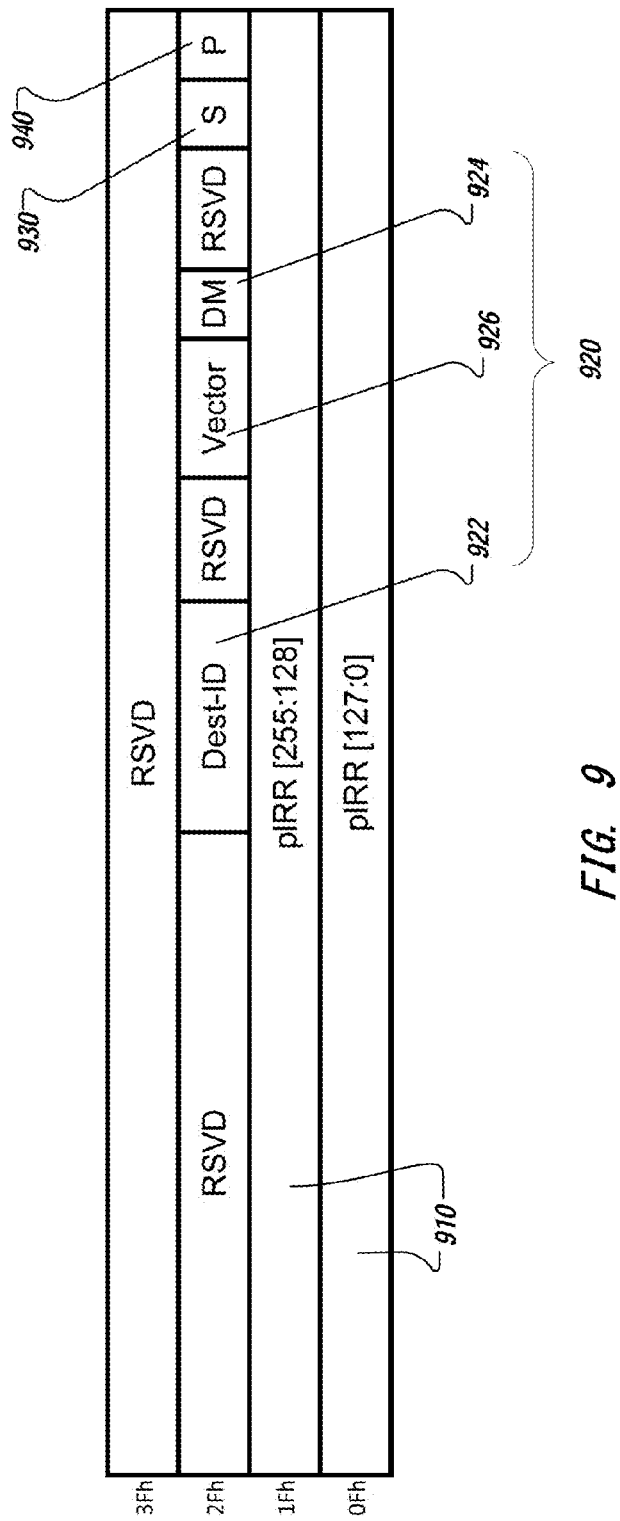
FIG. 9 is a block diagram representing a posted interrupt descriptor in accordance with at least one embodiment.

Turning to FIG. 9, a representation of a posted interrupt descriptor is shown, in accordance with at least one embodiment. Posted interrupt descriptor 900 in FIG. 9 can include one or more fields 910, 920, 930, and 940. For instance, field 910 may include the lowest 32 bytes of the 64-byte posted-interrupt descriptor to form a 256-bit posted interrupt request register ("pIRR"). Each bit of the pIRR may correspond to one of 256 virtual interrupt vectors for the virtual processor corresponding to the posted interrupt descriptor. Each bit of the pIRR may be set to post an interrupt request for the corresponding virtual interrupt vector.

Additional fields can be provided. For instance, field 920 can include three smaller bit-fields to indicate attributes of a notify event to be used to inform a VMM (e.g., of a physical processor hosting the targeted virtual processor) of pending posted interrupts. In one embodiment, the event used to notify a VMM that posted interrupts are pending may be a physical interrupt request to a physical processor hosting the targeted virtual resource. Therefore, using a physical processor that may support over one hundred physical interrupts, embodiments of the present invention may provide for over one hundred virtual processors per physical processor. Indeed, posted interrupt principles can be applied outside of the virtualization context to assist in expanding the amount of interrupts a physical processor can support, among other examples.

In one example, notify event attributes field 920 may include bit-fields 922, 924, and 926. Bit-field 922 ("Dest-ID") can include 32 bits to identify the destination of the interrupt request, which, for example, may be an identifier of the local Advanced Programmable Interrupt Controller (APIC) for the physical processor on which the virtual processor that is the target of the interrupt request is running. As noted, in some implementations, the physical processor to which the target virtual processor has temporal affinity may change as virtual processors are migrated, accordingly this field may be reprogrammed, by the VMM, with a new local APIC identifier in connection with a migration based on load balancing or any other reason. The physical processor to which a target virtual processor has temporal affinity at any given time may be called the "notify-CPU" in this description, as it will be the physical processor to which a notify event is to be sent when there are pending posted interrupts for that virtual processor.

Bit-field 924 ("DM") may include a single bit to indicate the mode for the notify event. For example, in an embodiment where the notify event is a physical interrupt, DM may indicate whether the value of Dest-ID should be interpreted as a physical or a logical identifier ("ID"). Further, Bit-field 926 ("Physical Vector") may include eight bits to indicate the physical vector to be used for the notify event. When a notify event is delivered to the VMM, the VMM may use the physical vector to determine which virtual processor has pending posted interrupts in its posted-interrupt descriptor. Therefore, embodiments of the present invention provide for a single physical vector per virtual processor, instead of a physical vector for each virtual interrupt.

In still another example, a posted interrupt descriptor can include a field 930 ("Suppress" or "S") may include one bit to store a suppress flag to indicate whether notify events are to be suppressed when posting interrupts to this posted-interrupt descriptor. Software, such as VMM, may set this bit at any time to suppress interrupt notify events so that sending of the events are postponed or cancelled, such as when the corresponding virtual processor is not running because it is in the scheduler wait queue waiting for one of its quanta of time to run, among other examples. Additionally, field 940 ("Pending" or "P") can be provided that includes one bit to store a pending flag to indicate whether there is a pending notify event for this posted-interrupt descriptor that has not been serviced yet. If this flag is already set at the time an interrupt request is posted, then there is no need to send another notify event. This flag may be set by hardware when it sends a notify event, and cleared by software as part of servicing the notify event. Protocol logic can access one or more of the fields of the posted interrupt descriptor to determine whether a notify is to be sent (e.g., when the descriptor shows a pending interrupt and a clear Suppress bit), among other examples and uses.

Returning to FIG. 8, a protocol agent 810 can include standalone finite state machine (FSM) logic 845 on a per root port or protocol basis. The FSM logic 845 can allow each protocol agent to perform posted interrupt operation independently, in turn giving higher performance interrupt delivery. For instance, each protocol agent (per port) can implement a respective posted interrupt FSM. This FSM can perform the steps of a "Fetch" phase (e.g., step 1020, 1025, 1030, 1035, 1040, 1045, 1050 of FIG. 10). As each root port implements independent posted interrupt FSMs, each port can process one posted interrupt (from that particular port) independently and in parallel with the other ports, thereby providing higher interrupt bandwidth in root complex. Such an implementation can facilitate read-modify-write operations as a posted transaction type (unlike some atomics, such as PCIe atomics, which are non-posted type transactions). This posted read-modify-write can be achieved by using a special representation in a RMW header to alert coherent logic of the operation and also a dedicated data return bus (e.g., 1045) from the coherent agent (e.g., 820) to the protocol agent (e.g., 810). By using an entirely posted-type RMW, protocol ordering rules (such as ordering rules defined in the PCIe specification) can be fully supported. Further, by using posted type transactions in all sub-stages of a posted interrupt, deadlock scenarios can be avoided (e.g., by avoiding posted and non-posted dependency).

As noted above, during a fetch phase, FSM logic 845 can send read-modify-write information (e.g., a RMW header and descriptor RMW values) in a RMW request to the coherency agent 820. The coherency agent 820 can include descriptor RMW logic 850. In response, to the RMW request, the descriptor RMW logic 850 can read the posted interrupt descriptor received from memory and modify the posted interrupt descriptor to record the interrupt in the posted interrupt descriptor (e.g., in the field(s) or structure of the posted interrupt descriptor). The descriptor RMW logic 850 can also set a status (e.g., a Pending field) of the posted interrupt descriptor to indicate "pending interrupt", to indicate to a corresponding physical processor that there are one or more interrupts pending in the memory region storing posted interrupt descriptors for one or more virtualized resources.

Along with writing the above information into the posted interrupt descriptor, the description RMW logic can capture the physical interrupt vector number, target physical processor, and urgency information, among other information included in the posted interrupt descriptor. This information can be reported back to the FSM logic 845 of the protocol agent 810 as notification interrupt information. This notification interrupt information can be sent from the coherency agent 820 to the protocol agent 810, in some implementations, on a dedicated bus. The protocol agent FSM logic 845 can then utilize information in the notification interrupt information (e.g., a Pending field, a Suppress field, etc.) to calculate whether a physical interrupt should be sent to the corresponding physical processor (e.g., the physical processor hosting the virtual processor targeted by the interrupt). If the protocol agent 810 determines that the interrupt notification is to be sent, the protocol agent 810 (e.g., using FSM logic 845) can fabricate a physical interrupt (e.g., fabricate an MSI), such as with the appropriate notification interrupt vector and physical processor identifier, and send the fabricated interrupt to the interrupt controller 825 (e.g., the interrupt controller of the targeted physical processor).

Figure 10:
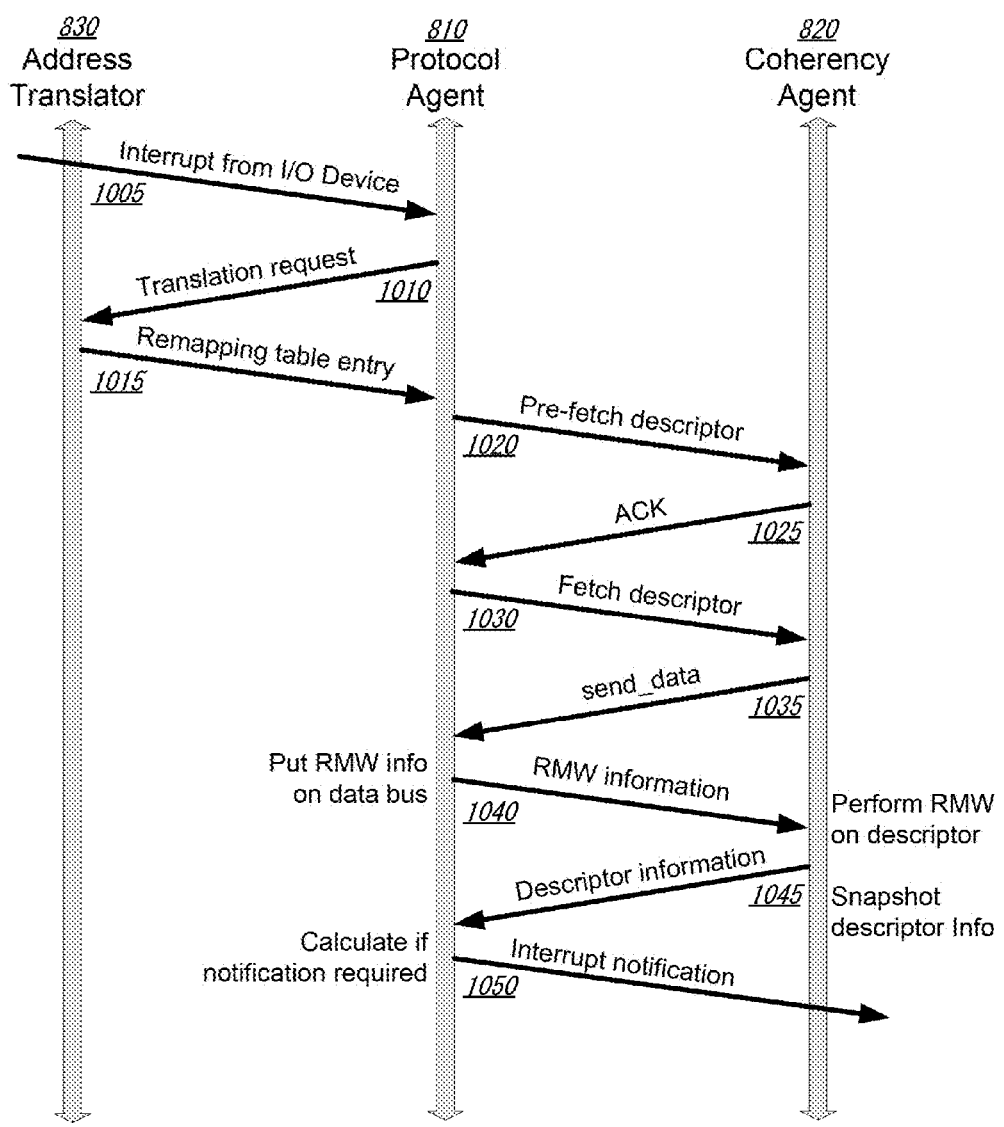
FIG. 10 is a flow diagram of an example posted interrupt transaction.

Turning to FIG. 10, a flow diagram 1000 is shown, illustrating a flow corresponding to the processing of a posted interrupt by logic including a protocol agent 810, a coherency agent 820, and address translation logic 830. A physical interrupt, or interrupt request, can be received and identified 1005 by the protocol agent 810 and the protocol agent can identify a handle from the interrupt. Using the handle, the protocol agent 810 can send a translation request 1010 to address translation logic 830, which can consult a remapping table to identify a table entry that dictate how and to which virtual machine the interrupt should be routed. The address translation module 830 can send a remapping table entry 1015 to the protocol logic which can include an indication that the interrupt targeting the resource associated with the handle are posted interrupts. In the case of posted interrupts, the remapping table entry 1015 can include a memory address corresponding to a posted interrupt descriptor cache line assigned to the virtual resource.

A pre-fetch stage can be entered, and the protocol agent can send a pre-fetch descriptor request to the coherency agent 820 to obtain ownership of the cache line (or other memory block) associated with the address included in the remapping table entry 1015. Upon obtaining ownership of the posted interrupt descriptor, the coherence agent can send an acknowledgement 1025 to the protocol agent 810, which the protocol agent 810 can interpret to enter a fetch stage. Accordingly, the protocol agent 810 can send a fetch descriptor request 1030 to the coherency agent 820 identifying the particular posted interrupt descriptor. In some instances, it is possible that after acquiring ownership of a posted interrupt descriptor cache line, ownership can be lost, for instance, because of snoops from core requests, VMMs, or other sockets' requests. In such cases, when a RMW fetch (e.g., 1030) is sent from the protocol agent to the coherency conversion agent, the coherency conversion agent can first check to ensure that it still has ownership of the posted interrupt descriptor cache line. If it is determined that the coherency agent does not have descriptor ownership, the coherency conversion agent can attempt to re-acquire ownership and will not issue a "send_data" acknowledgement 1035 until ownership of the posted interrupt descriptor is re-acquired. The protocol agent can wait until the "send_data" acknowledgement 1035 is sent before moving forward. Once the coherency conversion agent confirms or re-obtains ownership of the posted interrupt descriptor, the coherency conversion agent can issue a "send_data" signal 1035, lock the descriptor ownership, and suspend responding to any further snoops received from other agents for the posted interrupt descriptor cache line.

The interrupt 1005 (and, in some cases, the remapping table entry 1015) can include information describing the nature of the interrupt. The protocol agent 810 can build a desired RMW operation that it would like performed on the posted interrupt descriptor to provide this information in the posted interrupt descriptor. The desired RMW operation can be described in RMW information 1040 sent to the coherency agent. RMW information 1040 can be sent by the protocol agent 810 in response to receiving a send_data confirmation signal 1035 from the coherency agent 820. Further, the coherency agent 820, after receiving the RMW information from the protocol agent indicating what (if any) changes are to be made to the posted interrupt descriptor cache line, the coherency conversion agent can perform a corresponding read-modify-write operation on the posted interrupt descriptor to update posted interrupt descriptor fields as well as read values of the updated posted interrupt descriptor. Upon completion of the RMW operation, the coherency agent 820 can release ownership of the cache line.

The coherency agent 820 can report the completion of the RMW operation by providing posted interrupt descriptor information 1045 to the protocol agent 810 that identify values of the posted interrupt descriptor. The protocol agent 810 can use the information to determine if, when, and where to send an interrupt notification corresponding to the posted interrupt descriptor (and other original interrupt request 1005) to a physical processor hosting the virtual resource, for instance, based on the value of a pending and/or suppress field of the posted interrupt descriptor. For instance, posted interrupt descriptor information (and/or remapping table entries) can include values for an outstanding notification bit ("ON"), an urgent bit ("URG"), and a suppress notification bit ("SN"). When the values of these bits are (('ON'==0) AND (("URG"==1) OR ('SN'==0))), the result of a corresponding logical function results in a value of "1" indicating that the interrupt notification is to be sent. Accordingly, the protocol agent 810 can then, when appropriate, send the interrupt notification 1050.

In some instances, multiple I/O devices may send posted interrupts targeting the same posted interrupt descriptor (e.g., interrupts targeting the same virtualized processor). These interrupts may be sent from different I/O devices within substantially the same time window, which can causes conflict conditions either within a coherency conversion agent or across multiple coherency conversion agents (e.g., in different root complex sockets). If the conflict occurs within a coherency conversion agent, logic can be provided (e.g., in coherency conversion agent) to order the updates to the particular posted interrupt descriptor. For instance, a coherency conversion agent can maintain an ordering queue, which can place conflicting requests in a single first-in-first-out (FIFO) queue, so that the first request is served first and so on. This can also ensure that no forward progress issues emerge across different protocol agents and also guard against coherency issues (e.g., stale copies) while updating the posted interrupt descriptor. In cases where the conflict is across different coherency agents, the conflict can be a conflict resolution procedure. For instance, in a particular implementation, a home agent hosting a particular posted interrupt descriptor cache line in main memory can handle resolution of a conflict between multiple coherency agents. This can work to ensure that there is only one owner for a given cache line at any given point of time and that the current owner has the latest copy of cache line. Such mechanisms can also make sure that there are no issues related to loss of interrupt and no corruption of contents of related descriptors when the same descriptor is set to be updated by multiple coherency agents, among other examples.

Figure 11:
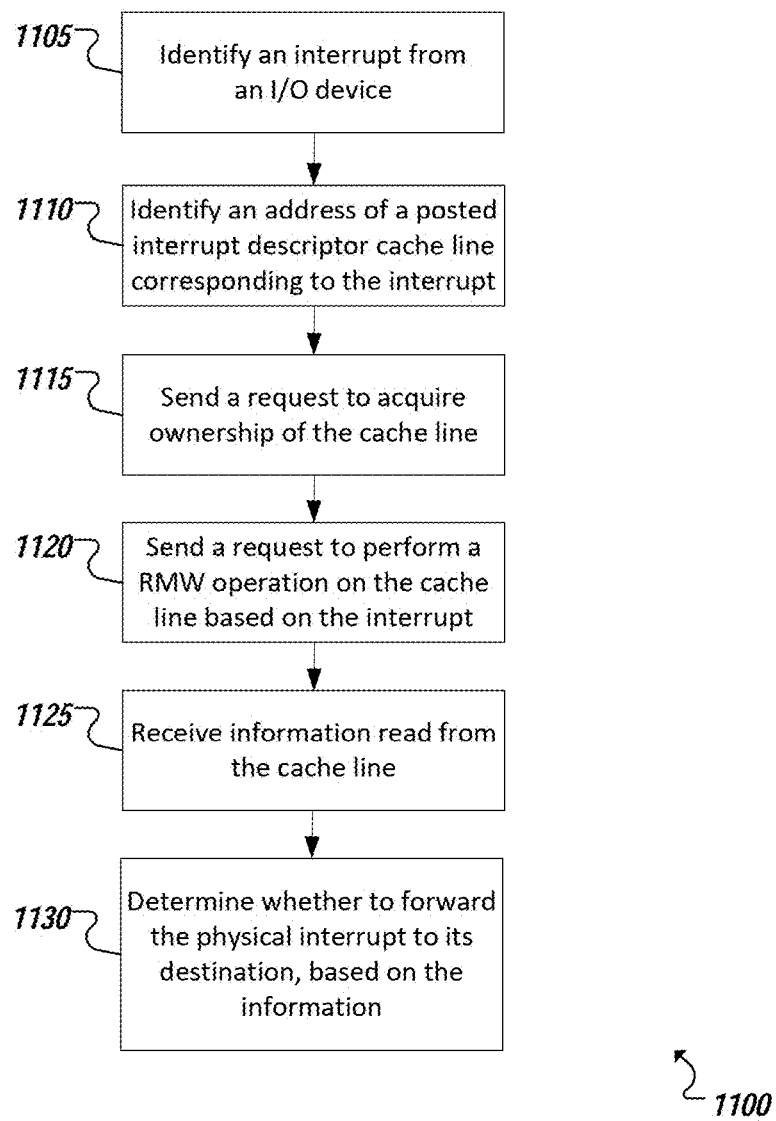
FIG. 11 is a flow diagram of example techniques in processing posted interrupts.

Turning to FIG. 11, a flowchart 1100 is shown illustrating example techniques in processing posted interrupts. For instance, an interrupt can be identified 1105 that was generated by a particular I/O device and is intended for a destination device. An address of a posted interrupt descriptor cache line can be identified 1110 that corresponds to the interrupt. A request to acquire ownership of the cache line can be sent 1115 and when ownership is acquired, a request to perform a read-modify-write (RMW) operation on the cache line can be sent 1120. The RMW operation can be based on characteristics of the interrupt. Information can be received 1125 from a read of the cache line and this information can be used to determine 1130 whether to forward the physical interrupt to its destination.

It should be noted that while much of the above principles and examples are described within the context of PCIe and particular revisions of the PCIe specification, the principles, solutions, and features described herein can be equally applicable to other protocols and systems. Further, note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 12:
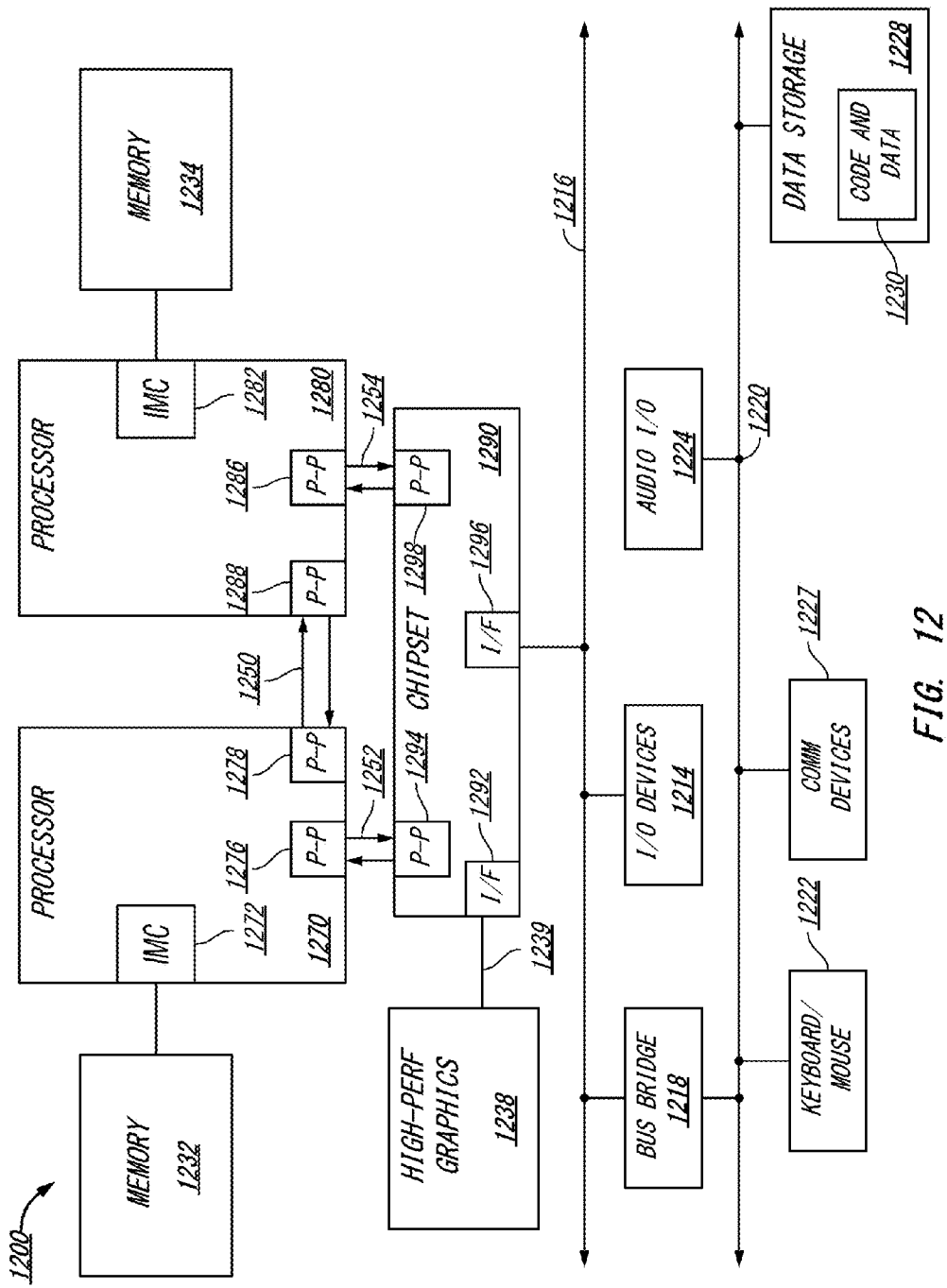
FIG. 12 illustrates an embodiment of a block for a computing system including multiple processors.

Referring to FIG. 12, an embodiment of a block diagram for a computing system 1200 including a multiprocessor system is depicted. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of a processor. In one embodiment, 1252 and 1254 are part of a serial, point-to-point coherent interconnect fabric, such as a high-performance architecture.

While shown with only two processors 1270, 1280, it is to be understood that the scope of the present invention is not so limited. In other embodiments, one or more additional processors may be present in a given processor.

Processors 1270 and 1280 are shown including integrated memory controller units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 each exchange information with a chipset 1290 via individual P-P interfaces 1252, 1254 using point to point interface circuits 1276, 1294, 1286, 1298. Chipset 1290 also exchanges information with a high-performance graphics circuit 1238 via an interface circuit 1292 along a high-performance graphics interconnect 1239.

A shared cache (not shown) may be included in either processor or outside of both processors; yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 are coupled to first bus 1216, along with a bus bridge 1218 which couples first bus 1216 to a second bus 1220. In one embodiment, second bus 1220 includes a low pin count (LPC) bus. Various devices are coupled to second bus 1220 including, for example, a keyboard and/or mouse 1222, communication devices 1227 and a storage unit 1228 such as a disk drive or other mass storage device which often includes instructions/code and data 1230, in one embodiment. Further, an audio I/O 1224 is shown coupled to second bus 1220. Note that other architectures are possible, where the included components and interconnect architectures vary. For example, instead of the point-to-point architecture of FIG. 12, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, hardware- and/or software-based logic, and a method to identify an interrupt from an input/output (I/O) device, identify an address of a particular cache line associated with the interrupt that is to correspond to a destination of the interrupt and represent one or more attributes of the interrupt. A request can be sent to a coherency agent to acquire ownership of the particular cache line and a request can be sent to perform a read-modify-write (RMW) operation on the cache line based on the interrupt.

In at least one example, information is received that was read from the particular cache line and a determination is made whether to forward the physical interrupt to the destination based on the information.

In at least one example, the information is read from the particular cache line by the coherency agent and the information is received from the coherency agent in association with the RMW operation.

In at least one example, the destination includes a virtual resource hosted by a physical processor and the physical interrupt is to be sent to the physical processor.

In at least one example, the virtual resource comprises a virtual processor.

In at least one example, the particular cache line is one of a plurality of posted interrupt descriptor cache lines and each posted interrupt descriptor cache line corresponds to a respective one of a plurality of interrupt destinations and each interrupt destination comprises a virtual resource.

In at least one example, ordering rules of a protocol are enforced in association with handling of the interrupt.

In at least one example, a protocol agent and coherency agent are included in a root complex and the root complex receives the interrupt.

One or more embodiments may provide an apparatus, a system, a machine readable storage, a machine readable medium, circuitry, hardware- and/or software-based logic to implement an address translator, a coherence agent, a protocol agent, and decision logic. The address translator can determine an entry in an interrupt remapping table associated with an interrupt identifier, the entry including an address of a particular cache line, the particular cache line to correspond to a destination of the interrupt, and the particular cache line is to describe attributes of the interrupt. The coherence agent can obtain ownership of the particular cache line and initiate a read-modify-write (RMW) operation on the particular cache line. The protocol agent can identify one or more characteristics of the interrupt and request the coherence agent to perform a RMW operation. The particular cache line is to describe the one or more characteristics. Decision logic can determine whether to forward the interrupt based on information to be included in the particular cache line.

In at least one example, the decision logic is included in the protocol agent.

In at least one example, the protocol interrupt remapping table maps addresses in a guest domain to an address in a host domain.

In at least one example, the protocol agent is to identify the handle and query the address translator for the address.

In at least one example, the information includes a suppress value and a pending value of the particular cache line.

In at least one example, ordering rules of a particular protocol are to be enforced using the protocol agent and the particular protocol comprises a Peripheral Component Interconnect (PCI) Express (PCIe)-based protocol.

In at least one example, one or more of the address translator, the coherence agent, the protocol agent, and decision logic can be included in a root complex.

In at least one example, the destination comprises a particular one of a plurality of virtual processors and the system further comprises a virtual machine manager.

In at least one example, a system can include a root complex and one or more I/O devices, the interrupt is received from one of the I/O devices and is intended for a particular one of the plurality of virtual processors.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
  a protocol agent to
    identify an interrupt from an input/output (I/O) device;
    identify an address of a particular cache line associated with the interrupt, wherein the particular cache line is to correspond to a destination of the interrupt, the particular cache line is to represent one or more attributes of the interrupt, the destination comprises a virtual processor, the particular cache line is one of a plurality of posted interrupt descriptor cache lines, and each posted interrupt descriptor cache line corresponds to a respective one of a plurality of virtual processors;
    send a request to a coherency agent to acquire ownership of the particular cache line; and,
    responsive to an acknowledgement that ownership has been acquired, send a request to perform a read-modify-write (RMW) operation on the cache line based on the interrupt.

2. The apparatus of claim 1, wherein the protocol agent is further to:
  receive information read from the particular cache line; and
  determine whether to forward the interrupt to the destination based on the information.

3. The apparatus of claim 2, wherein the information is read from the particular cache line by the coherency agent and the information is received from the coherency agent in association with the RMW operation.

4. The apparatus of claim 2, wherein the virtual processor is hosted by a physical processor and the interrupt is to be sent to the physical processor.

5. The apparatus of claim 4, wherein the physical processor is to be identified from the information.

6. The apparatus of claim 1, wherein the protocol agent is to enforce ordering rules of a protocol in association with handling of the interrupt.

7. The apparatus of claim 1, wherein the protocol agent and coherency agent are included in a root complex and the root complex receives the interrupt.

8. An apparatus comprising:
  an address translator to determine an entry in an interrupt remapping table associated with an interrupt identifier, wherein the entry comprises an address of a particular cache line, the particular cache line to correspond to a destination of the interrupt, the particular cache line is to describe attributes of the interrupt, the destination comprises a virtual processor, the particular cache line is one of a plurality of posted interrupt descriptor cache lines, and each posted interrupt descriptor cache line corresponds to a respective one of a plurality of virtual processors;
  a coherence agent to obtain ownership of the particular cache line and initiate a read-modify-write (RMW) operation on the particular cache line;
  a protocol agent to identify one or more characteristics of the interrupt and, responsive to an acknowledgement that ownership has been acquired, request the coherence agent to perform a RMW operation, wherein the particular cache line is to describe the one or more characteristics; and decision logic to determine whether to forward the interrupt based on information to be included in the particular cache line.

9. The apparatus of claim 8, wherein the decision logic is included in the protocol agent.

10. The apparatus of claim 9, wherein the interrupt remapping table maps addresses in a guest domain to an address in a host domain.

11. The apparatus of claim 9, wherein the interrupt identifier comprises a handle and the protocol agent is to identify the handle and query the address translator for the address.

12. The apparatus of claim 9, wherein the information comprises a suppress value and a pending value of the particular cache line.

13. The apparatus of claim 9, wherein ordering rules of a particular protocol are to be enforced using the protocol agent and the particular protocol comprises a Peripheral Component Interconnect (PCI) Express (PCIe)-based protocol.

14. A computer readable medium comprising code that, when executed, is to cause a computing device to:
identify an interrupt from an I/O device;
identify an address of a particular posted interrupt descriptor cache line, wherein the posted interrupt descriptor cache line corresponds to a destination of the interrupt, the posted interrupt descriptor cache line is to describe the interrupt, the destination comprises a virtual processor, the particular posted interrupt descriptor cache line is one of a plurality of posted interrupt descriptor cache lines, and each posted interrupt descriptor cache line corresponds to a respective one of a plurality of virtual processors;
send a request to a coherence agent to acquire ownership of the particular posted interrupt descriptor cache line; and
responsive to an acknowledgement that ownership has been acquired, send a request to perform a read-modify-write (RMW) operation on the posted interrupt descriptor cache line based on the interrupt.

15. The medium of claim 14, wherein identifying the address of the particular posted interrupt descriptor cache line comprises:
identifying a handle value included in the interrupt; and
querying a remapping table to determine a particular address corresponding to the handle value, wherein the particular address comprises the address of the particular posted interrupt descriptor cache line.

16. The medium of claim 14, wherein the code further is to cause the computing device to:
receive information read from the particular posted interrupt descriptor cache line; and
determine whether to forward the interrupt to the destination based on the information.

17. The medium of claim 16, wherein the information comprises a value to indicate whether the destination is associated with as a physical or a logical identifier, if a notify event is a physical interrupt.

18. A system comprising:
a processor;
a memory; and
a root complex comprising
an agent to
identify an interrupt addressed to a destination;
identify an address of a particular cache line, wherein the cache line corresponds to the destination, the cache line is to be encoded to describe the interrupt, the destination comprises a virtual processor, the particular cache line is one of a plurality of posted interrupt descriptor cache lines, and each posted interrupt descriptor cache line corresponds to a respective one of a plurality of virtual processors;
send a request to a coherence agent to acquire ownership of the particular cache line; and
responsive to an acknowledgement that ownership has been acquired, send a request to perform a read-modify-write (RMW) operation on the cache line based on the interrupt.

19. The system of claim 18, wherein the system further comprises a virtual machine manager.

20. The system of claim 19, further comprising
one or more I/O devices, wherein the interrupt is received from one of the I/O devices.

* * * * *